March 2, 1926.
A. FRIESENHAHN
ANIMAL TRAP
Filed Feb. 25, 1925
1,574,806
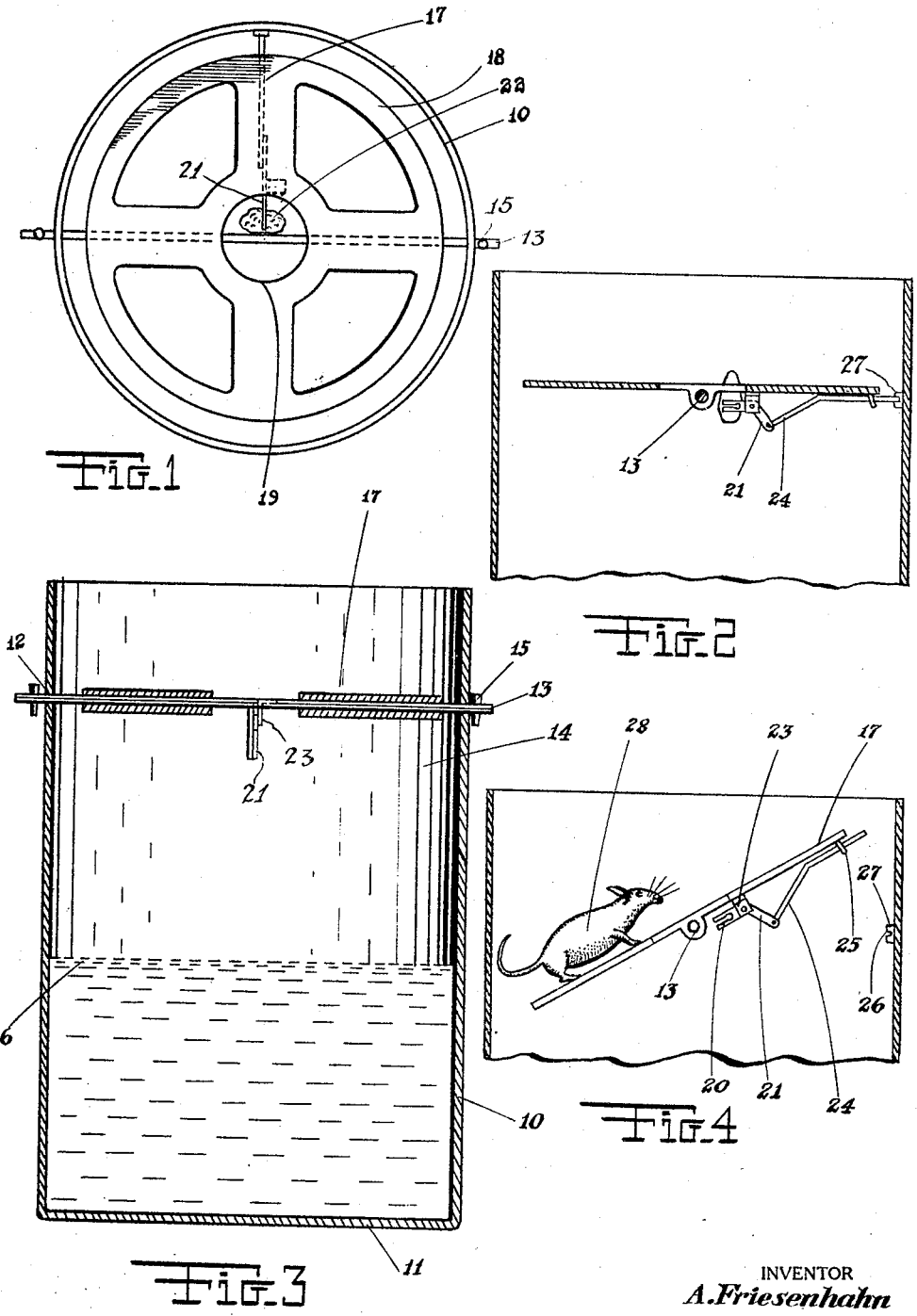

Patented Mar. 2, 1926.

1,574,806

UNITED STATES PATENT OFFICE.

ALBERT FRIESENHAHN, OF BRACKEN, TEXAS.

ANIMAL TRAP.

Application filed February 25, 1925. Serial No. 11,396.

*To all whom it may concern:*

Be it known that I, ALBERT FRIESENHAHN, a citizen of the United States, residing at Bracken, in the county of Comal and State of Texas, have invented certain new and useful Improvements in Animal Traps, of which the following is a specification.

The main object of this invention is to provide a device which is adapted to be set up in a house or barn where cotton seed or cane sugar is stored to trap such animals as rats or the like, which are ruinous to the harvest. This device has for its main object to provide the animal with food which is used as a bait, drawing the animal to the trap, which is sprung by the animal itself pulling the bait. The rat upon actuating the trap is precipitated into a body of water within the trap and drowned.

The above and other objects will become apparent in the description below, in which like characters of reference refer to like-named parts in the drawing.

Referring briefly to the drawing, Figure 1 is a top plan view of the trap.

Figure 2 is a sectional elevation view of the upper section of the trap, showing the door or platform in set position.

Figure 3 is a sectional side elevational view of Figure 1.

Figure 4 is a view similar to Figure 2, showing an animal on the platform being precipitated into the bottom of the trap.

Referring in detail to the drawing, the numeral 10 indicates a hollow cylinder which may be composed of glass or any desirable material and is provided with a closed bottom 11 at its lower end. This cylinder has a pair of diametrically opposed openings 12 near its upper end and thru these openings, a rod 13 is inserted. The rod 13 spans the chamber 14 of the cylinder and extends diametrically across the latter and is secured in place by tapering pins 15 which pass thru holes formed in the rod 13 exterior of the wall of the cylinder. The cylinder chamber 14 is filled with a liquid 16 to a desirable level into which the animal is plunged when falling from the trapping platform. The trapping platform is mounted on the rod 13 and comprises an annular disk 17 which is provided with a plurality of enlarged openings 18 thru which the water in the bottom of the cylinder 14 may be observed. An additional smaller opening 19 is formed in the center of the disk, and thru this opening the bifurcated end 20 of the lever 21 is visible. Between the bifurcated ends of the lever 21, a small piece of bait 22, such as bacon or the like, may be inserted as an attraction to the animal. This lever is bent into the form of an obtuse bell crank and is pivotally suspended from a bracket 23 which is rigidly mounted on the bottom face of the trapping platform 17. An angular stem 24 has its one end pivotally secured to the bell crank 21 and the opposite end is slidable in a loop 25. The end which extends thru the loop 25 projects beyond the periphery of the trapping platform and is adapted to be engaged in a recess 26 formed in a lug 27, the latter being a projection on the interior of the cylinder wall 10.

The trap is used in the following manner. The cylinder 10 is partly filled with water 16 and is buried in a heap or pile of cotton or cane sugar, according to the way in which it is used, up to its upper edge. The trapping platform is set by rotating the lever or bell crank 21 until the stem 24 has its outer end enter into the recess 26 formed in the lug 27. When in this position, the trap is set and ready to trap an animal. The rodent 28 sniffs about the upper edge of the cylinder 10 and finally sees and smells the bait 22 and steps down upon the platform. The animal settles itself on the trapping platform 17 and begins to munch the bait and also tries to pull the bait from the bifurcated end 20 of the lever. In so doing, this bifurcated end of the lever 21 is lifted upwardly, causing the opposite arm to rotate toward the center of the disk 17, thus releasing the projecting end of the stem 24 from the recess 26. As the end of the stem 24 is released from out the recess 26, the disk 17 becomes top-heavy, owing to its being off-set from the axis of rotation vertically, and as the animal's weight is balanced on one side of the pin 13, the disk 17 rotates an arcuate distance of 180 degrees in a comparatively short interval of time, so that the length of time required for the entire operation of causing the animal to be precipitated into the water 16 will not be sufficient to permit said animal to regain its self possession.

I claim:—

A trap comprising a cylinder having a bottom thereon and adapted to be partly filled with liquid, an annular disk in said cylinder, a rod supporting said disk, a stem slidable beneath said disk, a lug on said cylinder, said stem being adapted to engage the lug to lock the disk in horizontal position, said lug having a recess therein adapted to receive the end of said stem, a bell crank pivotally connected to said stem, said bell crank when lifted being adapted to release the stem from the recess to permit rotation of the disk, said bell-crank comprising an obtuse angled lever having a bifurcated end, a bracket mounted on the underside of said disk and adapted to pivotally support said lever, and bait adapted to be pinched in the bifurcated end of said bell crank, said disk having an opening above the bifurcated end of the bell crank to permit visibility of the bait.

In testimony whereof I affix my signature.

ALBERT FRIESENHAHN.